(12) United States Patent
Gaffga

(10) Patent No.: US 8,146,102 B2
(45) Date of Patent: Mar. 27, 2012

(54) DEVELOPMENT ENVIRONMENT FOR GROUPWARE INTEGRATION WITH ENTERPRISE APPLICATIONS

(75) Inventor: Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 1083 days.

(21) Appl. No.: 11/615,892

(22) Filed: Dec. 22, 2006

(65) Prior Publication Data

US 2008/0155561 A1    Jun. 26, 2008

(51) Int. Cl.
*G06F 15/163* (2006.01)
(52) U.S. Cl. .......... 719/318; 718/102
(58) Field of Classification Search .......... 719/318; 718/102

See application file for complete search history.

(56) References Cited

U.S. PATENT DOCUMENTS

| | | | | |
|---|---|---|---|---|
| 5,463,620 | A * | 10/1995 | Sriram | 370/412 |
| 2004/0059789 | A1* | 3/2004 | Shum | 709/206 |
| 2004/0153545 | A1* | 8/2004 | Pandya et al. | 709/226 |
| 2005/0144483 | A1* | 6/2005 | Robertson et al. | 713/201 |
| 2006/0177024 | A1* | 8/2006 | Frifeldt et al. | 379/88.22 |
| 2006/0195781 | A1* | 8/2006 | Jatavallabha et al. | 715/506 |
| 2008/0091774 | A1* | 4/2008 | Taylor et al. | 709/203 |

OTHER PUBLICATIONS

Houstis, C., W. Kelly, B. Leon. "Distributed Control for a Variable Length Message Store-and-Forward System". IEEE Transactions on Communications (Apr. 1978). vol. 26, Issue 4. pp. 465-470.*
Pan, Shan L., and Jae-Name Lee. "Using E-CRM for a Unified View of the Customer". Communicaitons of the ACM (Apr. 2003). vol. 46, No. 4. pp. 95-99.*
Maheshwari, P.; Tang, H.; Liang, R.; , "Enhancing Web services with message-oriented middleware," Web Services, 2004. Proceedings of the IEEE International Conference on Web Services (Jul. 6-9, 2004), pp. 524-531 [retrieved from http://ieeexplore.ieee.org/stamp/stamp.jsp?tp=&arnumber=1314778&isnumber=29136].*
Monson-Haefel, R. and Chappel, D., "Java Message Service," O'Reilly Media (Jan. 2001).*

* cited by examiner

*Primary Examiner* — H. S. Sough
*Assistant Examiner* — Brian Wathen
(74) *Attorney, Agent, or Firm* — Schwegman, Lundberg & Woessner, P.A.

(57) ABSTRACT

This disclosure relates to application integration and, more particularly, groupware integration with enterprise applications. Various embodiments herein provide systems, methods, and software to integrate one or more computer applications with one or more groupware applications. Some embodiments include a groupware integration engine that receives, stores, and sends messages between computer applications and groupware clients applications.

17 Claims, 8 Drawing Sheets

DEVELOPMENT ENVIRONMENT FOR GROUPWARE INTEGRATION WITH ENTERPRISE APPLICATIONS

TECHNICAL FIELD

This disclosure relates to application integration and, more particularly, groupware integration with enterprise applications.

BACKGROUND INFORMATION

Groupware applications, such as MICROSOFT® OUTLOOK®, are used by most organizations for many purposes. Some such purposes include email, calendaring, scheduling of resources such as meeting rooms, task tracking, and maintaining contact information for an organization and even its customers and other stake holders. Some organizations further leverage customizable features of groupware applications for purposes such as vacation requests and approvals, check or payment requests and approvals, and other purposes.

Many of these same organizations also utilize computer applications, such as Enterprise Resource Planning ("ERP") applications to maintain some of the same information as the groupware applications. In such instances, configuration information and production data are maintained in both computer applications and the groupware applications. This requires synchronization of information between the computer applications and the groupware application.

Previous efforts to synchronize the data have failed to fully synchronize the computer applications and groupware applications.

DETAILED DESCRIPTION

Figure 1:
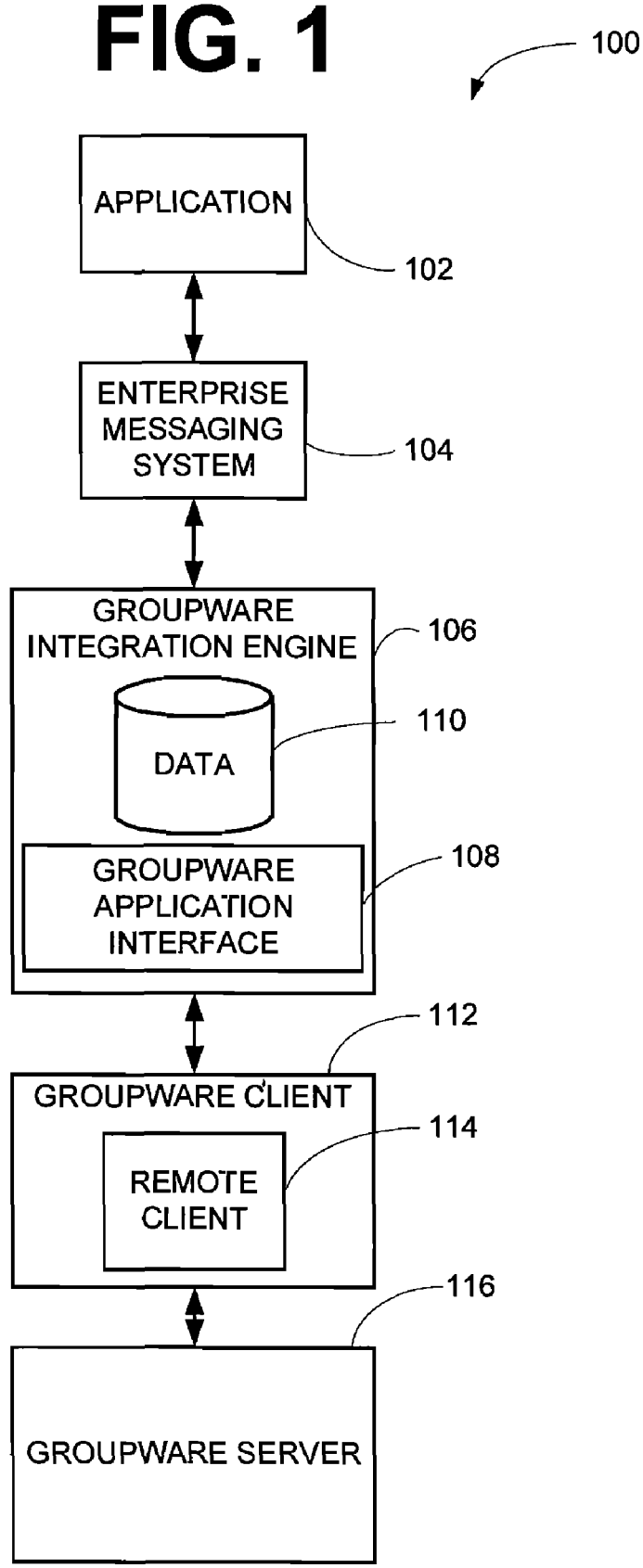
FIG. 1 is a logical system architecture diagram according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

The methods and processes described herein, in some embodiments are encoded as instructions on a computer-readable medium to cause a computing device to perform the method.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Various embodiments described herein provide systems, methods, and software to integrate one or more computer applications, such as Enterprise Resource Planning ("ERP") applications, with one or more groupware applications. In some embodiments, the synchronization synchronizes not only operational data and messaging, but also configuration information, such as role assignments. In some embodiments, the concept of a role is defined within an application. A role may have certain data access and manipulation privileges. A role may also be a recipient of certain groupware content such as messages, appointments/meetings, contact updates, and so on. A role may also have one or more persons assigned to it. Thus, a person assigned a role will then receive groupware content for not only the individual person, but also for the role the person is assigned. Some embodiments, described herein, allow for configuration of roles in one central location. In other embodiments, a role may be configured on either an application side or a groupware side and the configuration settings are populated from one side to the other via a groupware integration engine as described below.

FIG. 1 is a logical system architecture diagram according to an example embodiment. FIG. 1 illustrates a networked system 100 including an application 102, an enterprise messaging system 104, a groupware integration engine 106, a groupware client 112, and a groupware server 116.

The application 102 can include virtually any application to synchronize with a groupware application. In some embodiments, the application 102 is an ERP application, such as an application available from SAP, AG of Waldorf, Germany. In various embodiments, the groupware application may be MICROSOFT® OUTLOOK®/EXCHANGE®, LOTUS® NOTES®/DOMINO® or other groupware application.

The enterprise messaging system 104 includes any readily available enterprise messaging system. The enterprise messaging system 104 facilitates communication of messages between the application 102 and the groupware integration engine 106. The enterprise messaging system 104 generally includes a set of published Enterprise-wide standards that allows an organization to send semantically precise messages between computer systems. The enterprise messaging system 104 promotes loosely coupled architectures that allow changes in the formats of messages to have minimum impact on message subscribers, such as applications, groupware applications, and systems of other organizations an enterprise may exchange messages with. Many enterprise messaging systems are facilitated by the use of XML messaging, SOAP, Web services, and other similar technologies and standards.

The groupware integration engine 106 includes one or more groupware interfaces 108 and a message repository 110. The groupware integration engine 106 receives messages from both the enterprise messaging system 104 and groupware clients, such as groupware client 112. The groupware integration engine 106 stores received messages in the message repository 110 for delivery to either the application 102 or a groupware client 112. In some embodiments, messages are delivered by the groupware integration engine 106 to the application 102 and the groupware client 112 when queried for messages by the respective application 102 or groupware client 112. In some embodiments, a message stored in the message repository 110 may include one or more designated recipients. In such instances, the message may be stored once and tagged for delivery to more than one groupware client 112. In other instances, the message may be stored multiple times, once for each groupware client 112 of the respective recipients.

In some embodiments, the one or more groupware interfaces 108 are interfaces that translate messages, including content other than strict messages, to and from a format of a target groupware client type, such as MICROSOFT® OUTLOOK®. The one or more groupware interfaces 108 communicate with a remote client 114 that is installed and configured on the groupware client 112. Thus, when the groupware client 112 sends messages or requests and receives messages from the groupware integration engine 106, the remote client 114 of the groupware client 112 establishes a network communication session with an appropriate groupware interface 108 of the groupware integration engine 106. The appropriate groupware interface 108 retrieves the messages for a specific groupware client 112, translates the messages from a neutral format of the message repository 110 to a groupware client 112 specific format, and communicates the message to the remote client 114. The appropriate groupware interface 108 is determined as a function of the groupware client 112 type. The remote client 114 then populates the messages into an appropriate location of the groupware client 112.

In some embodiments, the groupware client 112 synchronizes its data with the groupware server 116. This can include saving received email messages, loading appointments scheduled by the application 102 and received via the groupware integration engine 106, contact entry updates, and other messages and content types received via the groupware integration engine 106.

In some embodiments, the application 102 may include data designating certain users, or people, with specific roles, such as manager. A role may be defined in the application 102 and synchronized with a shadow of the role and other configuration data in the groupware integration engine 106. In other embodiments, the groupware integration engine 106 accesses role information and other configuration information of the application 102 via the enterprise management system 104. This sharing or shadowing of configuration and role information provides a centralized mode of configuring information between the application 102, groupware integration engine 106, and the groupware client 112.

The groupware client 112 role and configuration information is centralized in such embodiments because messages sent to the groupware client 112 via the groupware integration engine 106 can be manipulated by the groupware integration engine 106 groupware interface 108 to prevent or allow a user to perform certain actions. In some embodiments, the action can include approving a vacation request when the message received is a programmed vacation request form operative within the groupware client. A manager who receives the message may approve the request. However, in an instance where there are multiple managers, the role information may define a relationship between a manager and an employee. In such an instance, only the designated manager of the employee may approve the request although when the request is sent, courtesy copies of the message may also be sent to other individuals who may need to be aware of the request.

In some embodiments, the configuration information includes conflict resolution rules to resolve conflicts between data of a groupware client 112 and data of the application 102. Data conflict resolution rules are readily know to one of skill in the relevant technology. However, in these and other embodiments, a notification message of a conflict is presented to a groupware client 112 user with selectable options to resolve the conflict.

Figure 2:
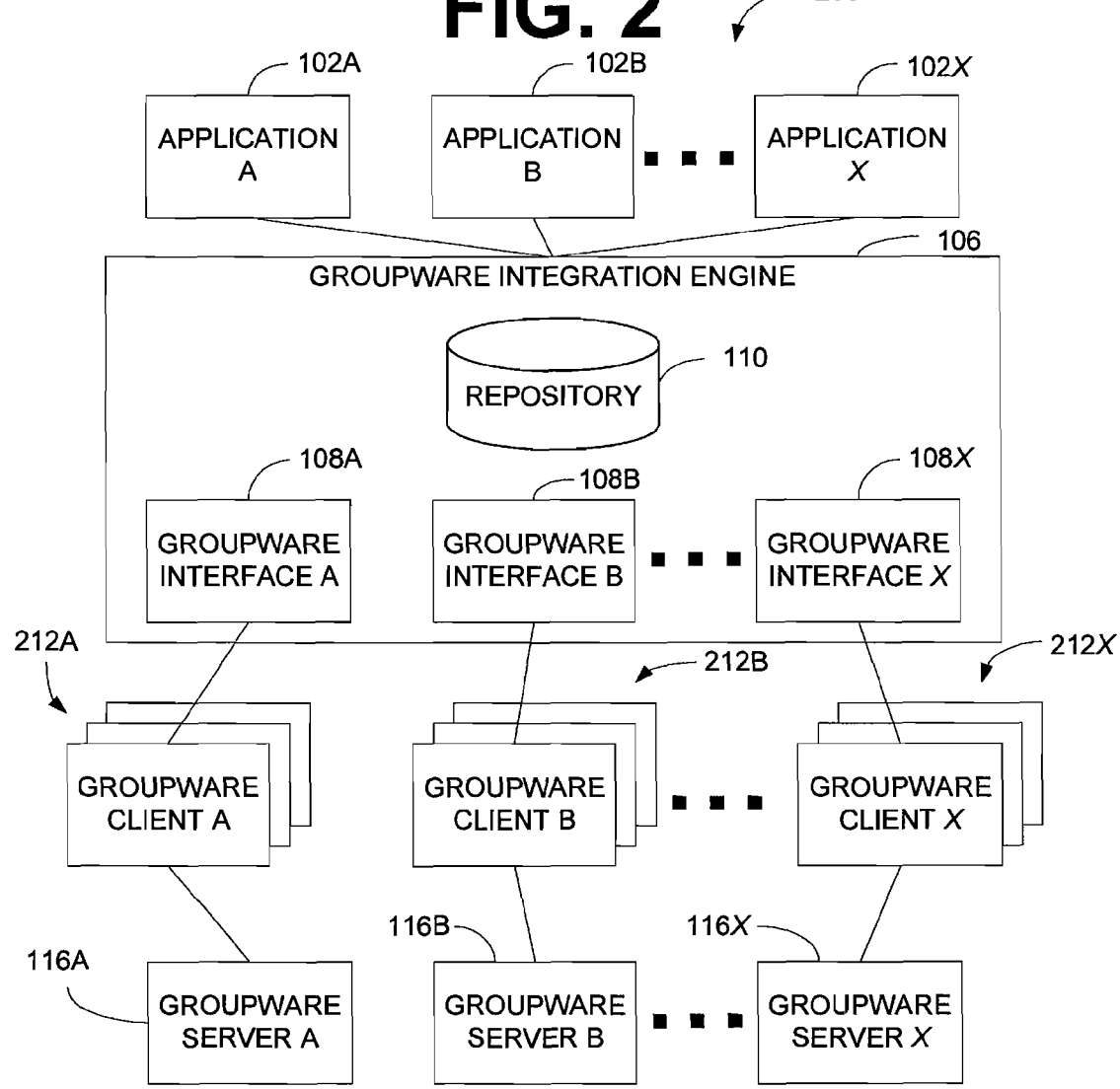
FIG. 2 is a logical system architecture diagram according to an example embodiment.

FIG. 2 is a logical system architecture diagram according to an example embodiment. FIG. 2 illustrates an example embodiment of a system 200 which is similar to the system 100 of FIG. 1, except that the example system 200 is a larger scale integration. The example system 200 allows groupware integration with multiple applications 102A, 102B, . . . 102x via a single groupware integration engine 106.

The system 200 includes multiple applications 102A, 102B, . . . 102x that communicate with the groupware integration engine 106. The applications 102A, 102B, . . . 102x communicate with the groupware integration engine 106 via an enterprise messaging system (not illustrated).

The system 200 also includes multiple groupware client types 212A, 212B, . . . 212x. Each groupware client of each groupware client type 212A includes a groupware type specific remote client. Also, each groupware client type 212A, 212B, . . . 212x includes a corresponding groupware interface 108A, 108B, . . . 108x. The groupware client type specific groupware interfaces 108A, 108B, . . . 108x are utilized to facilitate communication and data exchange between the groupware integration engine 106 and the groupware clients.

The example system 200 also includes multiple groupware servers 116A, 116B, . . . 116x. There is a groupware server 116A, 116B, . . . 116x for each corresponding groupware client type 212A, 212B, . . . 212x.

Figure 3:
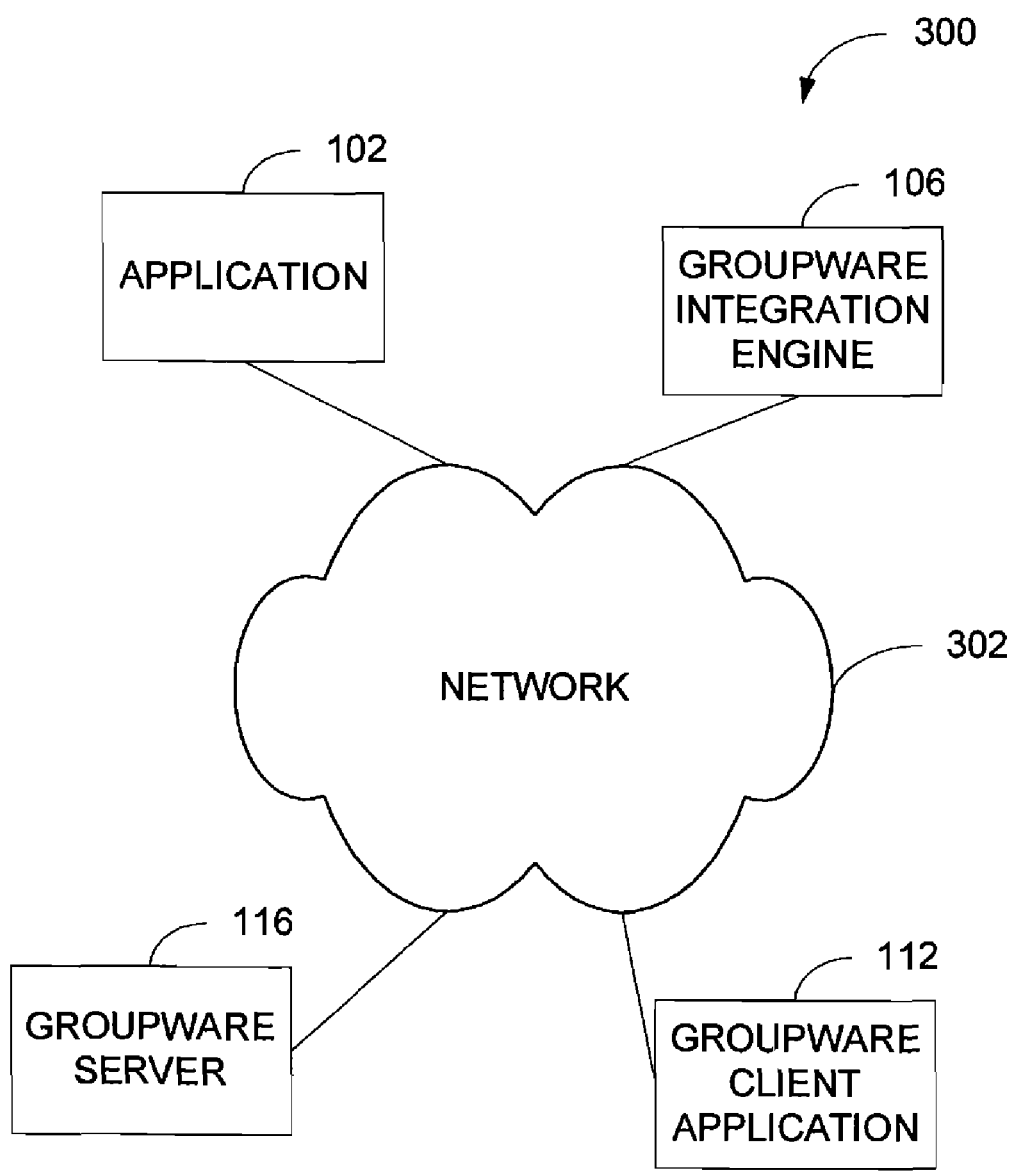
FIG. 3 is a physical system architecture diagram according to an example embodiment.

FIG. 3 is a physical system architecture diagram according to an example embodiment. FIG. 3 illustrates a system 300 including the application 102, groupware integration engine 106, groupware client 112, and groupware server 116 interconnected via a network 302. In some embodiments, the network 302 includes one or more of a local area network ("LAN"), wide area network ("WAN"), system area network, storage area network, value added network ("VAN"), a virtual private network ("VPN"), the Internet, and other network types. The various portions of the system 300 may be connected to the network 302 by one or more network connections. The network connections may include wired and wireless connection technologies. Although the application 102, groupware integration engine 106, groupware client 112, and groupware server 116 are illustrated as single boxes, this need not be the case. One or more of the application 102, groupware integration engine 106, groupware client 112, and groupware server 116 may operate on a single computing device. At the same time, one or more of the application 102, groupware integration engine 106, groupware client 112, and groupware server 116 may individually operate on more than a single computing device.

Figure 4:
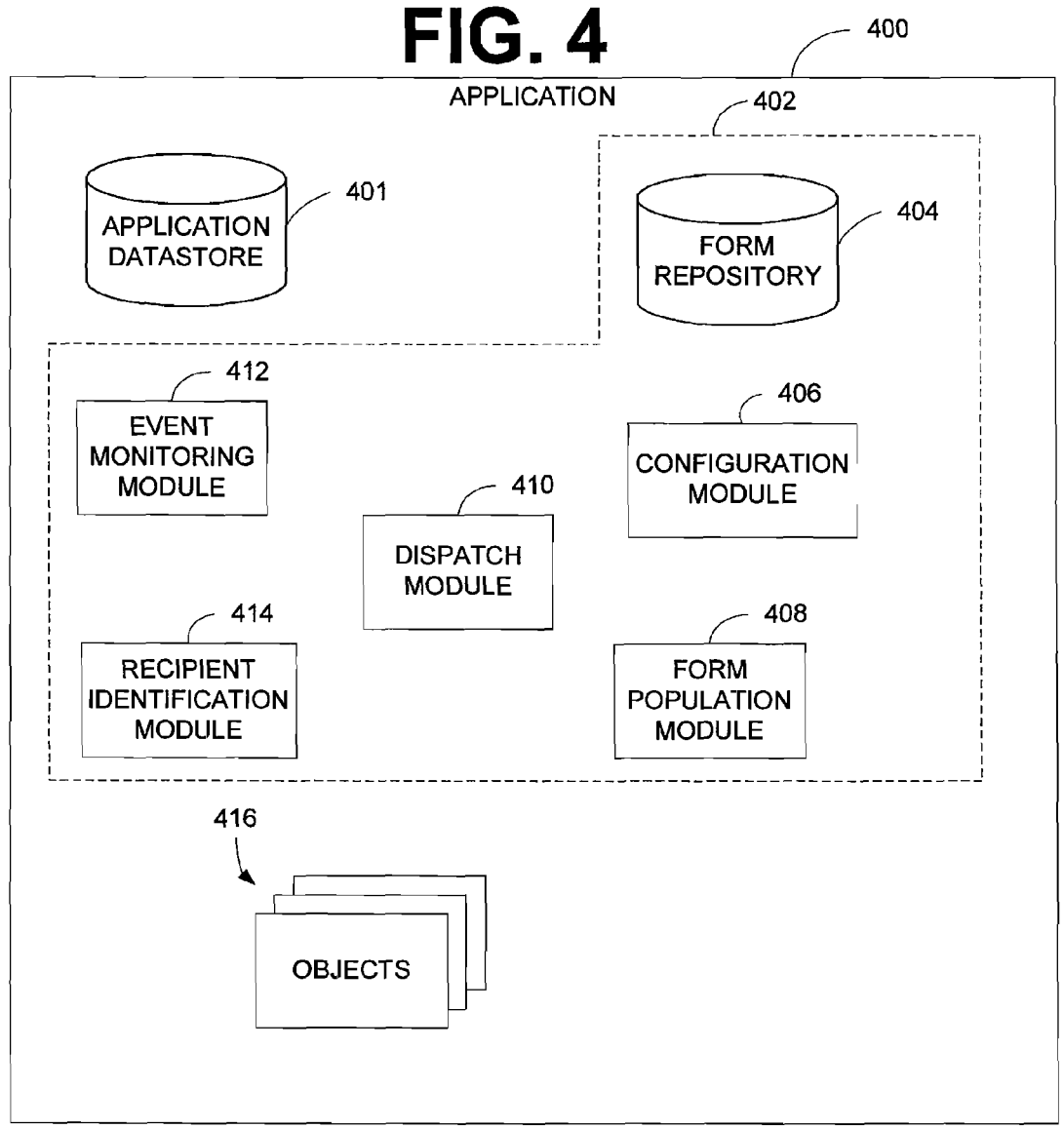
FIG. 4 is a logical block diagram of an application including groupware integration modules according to an example embodiment.

FIG. 4 is a logical block diagram of an application 400 including groupware integration modules 402 according to an example embodiment. The application 400 also includes an application 400 data store 401 and objects 416.

The application 400 is an example of an application, such as an Enterprise Resource Planning ("ERP") application, that provides functionality to processes and users. In some embodiments, the application 400 includes a service oriented architecture that provides the functionality through the objects 416. The objects 416, in such embodiments, operate according to configuration settings stored in an application data store 401 or other configuration setting storage location. The objects 416 operate on and store data in the application data store 401.

In some embodiments, the groupware integration modules 402 may include a form repository 404, a configuration module 406, a form population module 408, a dispatch module 410, an event monitor 412, a recipient identification module 414, and other modules depending on the specific embodiment.

The event monitoring module 412, in some embodiments, is included as one of the objects, or other processes, of the application 400. The event monitoring module 412 monitors one or more of the application, data in the application data store 401, or other portions of the application 400 for event occurrences. An event may include an update to data in the application 400, such as an update to a customer address. Another event that may occur includes a current date that triggers the need for an action, such as by a sales person to contact a customer. Various other event types are contemplated and will be readily identifiable to a person of skill in the relevant art. Generally, an event is an occurrence of something in the application 400 or something in relation to data stored in the application 400 that creates a need for an action. An action may include the need to send a message to a person, a role, a process, or other recipient.

Events are defined within configuration information stored in the application 400 or another location accessible by the event monitoring module 412. Events may be defined utilizing the configuration module 406, within a form definition stored in the form repository 404, in configuration settings of the application 400, or elsewhere. In some embodiments, an event definition identifies a data item to monitor for change or a match with a current date. Another event definition may be associated with other data, objects, or processes in the application. Event definitions also include an association with one or more form definitions stored in the form repository 404. Thus, in some embodiments, when the event monitoring module 412 identifies an event occurrence as a function of an event definition, the event monitoring module 412 passes a message to the form population module 408. The form population module 408 then populates the one or more forms associated with the identified event.

The form repository 404 is a storage location for form definitions. A form is a message template including data fields. In some embodiments, a form definition includes a mapping of application 400 data stored in the application data store 401 to the form data fields. A form definition may also include a mapping to one or more roles or people to send a message generated as a function of the form definition. In some embodiments, the form definition includes rules, the application of which may determine who is to receive the form. In some embodiments, the rules may also define who is able to take action with regard to the populated form. For example, if the form is a vacation request, the form may include a rule that when applied causes the vacation request form to be sent to a human resources role and a manager role. The rule may further prevent the human resources role from approving the vacation request form, but may allow the human resources role to disapprove the form if the requester does not have enough vacation days to permit the request. The same rule, or another, may also allow the manager to approve or deny the request.

Role definitions and mappings of roles to individuals, in some embodiments, is defined in and stored as part of the application 400. In other embodiments, the role definitions may be shadowed in a groupware integration engine as discussed above.

The form population module 408, in typical embodiments as discussed above, is triggered by the event monitoring module 412. Once triggered, the form population module retrieves a form associated with an identified event occurrence from the form repository. The form population module 408 then populates the retrieved form with data retrieved from the application data store 401 as a function of the event occurrence.

After the form is populated with data, the recipient identification module 414 operates to identify one or more recipients of the populated form as a function of the event occurrence. The recipient identification module 414 may apply one or more rules included within a form definition to identify one or more recipients of the populated form. The recipient identification module 414 may also determine form permissions of each of the one or more recipients. The form permissions may allow or disallow one or more of the recipients to take certain actions with the populated form once received. Once the recipient identification module 414 identifies the one or more recipients of the populated form, the populated form and the identified recipients and permission data is sent to the dispatching module 410.

The dispatching module 410 dispatches the populated form to a groupware integration engine, as discussed above, designated for delivery to the one or more identified recipients. In some embodiments, the dispatching module utilizes an enterprise messaging system to communicate the populated form to the groupware integration engine. In some embodiments, this messaging utilizes eXtensible Markup Language ("XML") encoded data.

In some embodiments, the event monitoring module 412 caches identified event occurrences for a period of time. In some embodiments, events are cached during certain time frames, such as Monday mornings between 7:00 AM and 12:00 PM during high application 400 usage times. In this embodiment, the caching of events during high application 400 usage times prevents the groupware integration modules 402 from increasing application 400 latency.

In typical embodiments, when a populated form is received by a recipient, the form is operable within the groupware client application of the recipient. For example, if the form received is a contact update form, the form executes within the groupware client application to locate the contact to be updated and update the contact information of the contact. Other forms may be interactive forms that request input or an action from the recipient. After the input is received or the action taken, the form or another form or message may be returned to the application 400 or sent to another user as a function of the received form.

Figure 5:
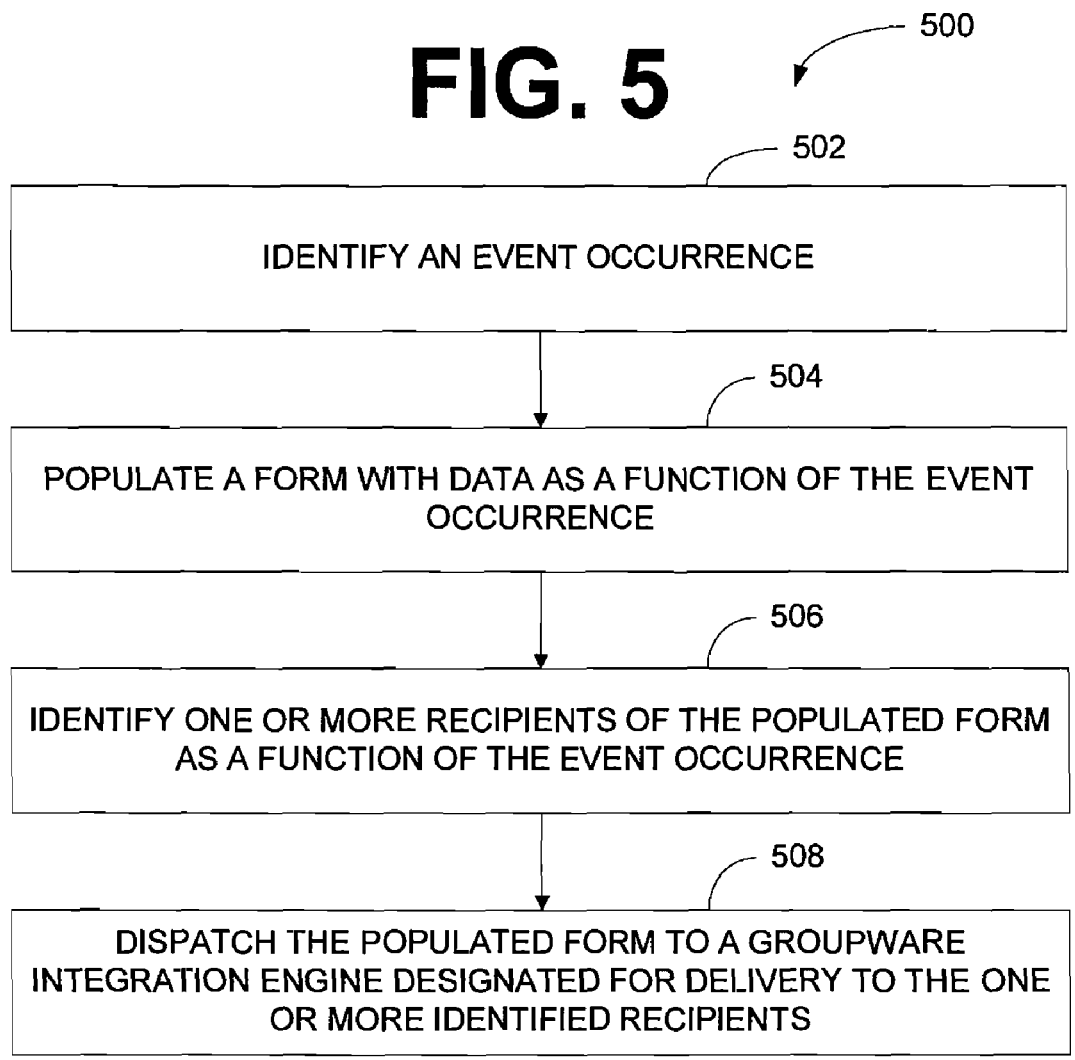
FIG. 5 is a flowchart of a method according to an example embodiment.

FIG. 5 is a flowchart of a method 500 according to an example embodiment. The method 500 includes identifying an event occurrence 502 and populating a form with data as a function of the event occurrence 504. The example method 500 further includes identifying one or more recipients of the populated form as a function of the event occurrence 506 and dispatching the populated form to a groupware integration engine designated for delivery to the one or more identified recipients 508. Some embodiments of the example method 500 further include caching identified event occurrences for a period of time and performing the form population, recipient identification, and form dispatching after passage of the period of time.

Figure 6:
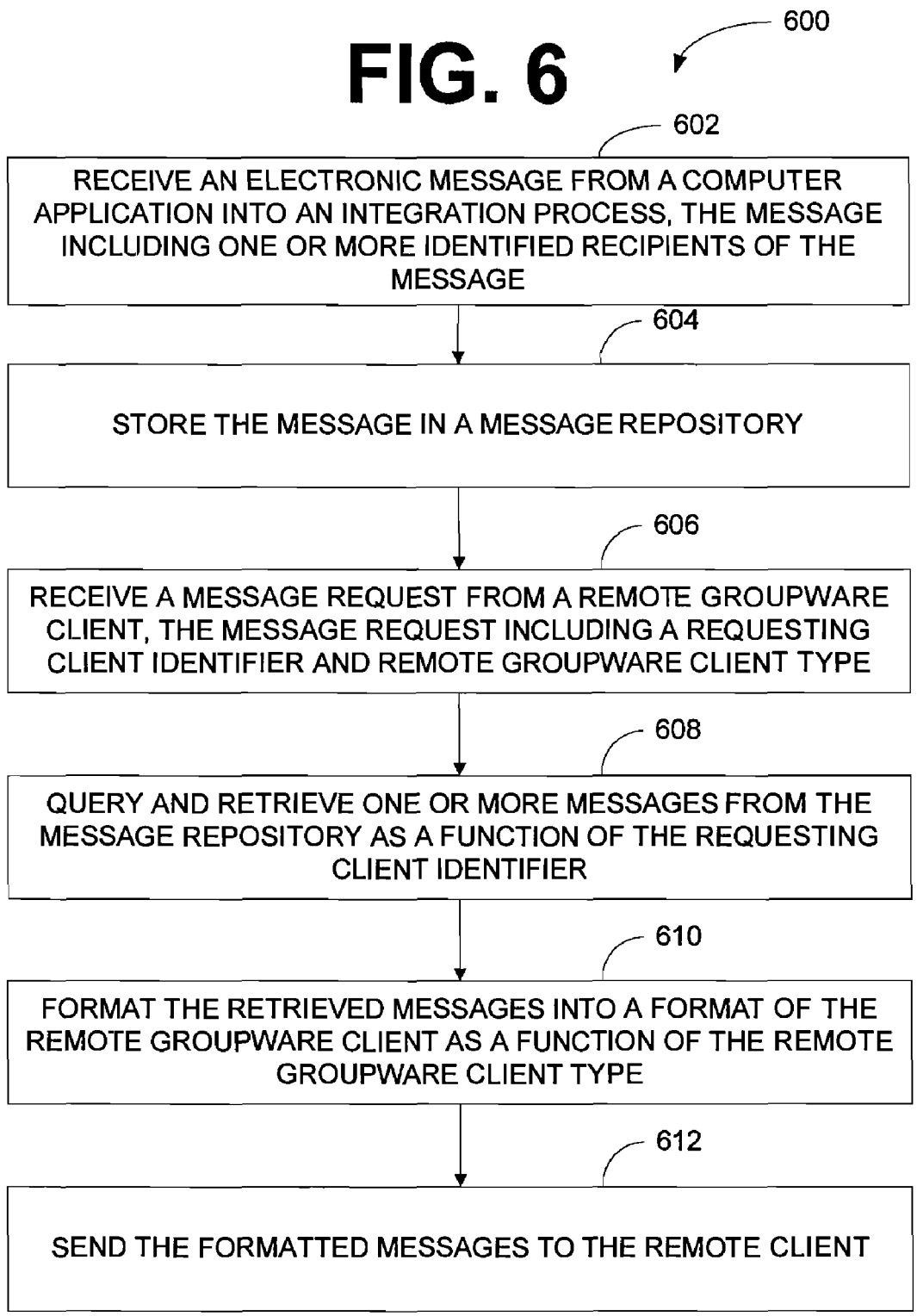
FIG. 6 is a flowchart of a method according to an example embodiment.

FIG. 6 is a flowchart of a method 600 according to an example embodiment. The example method 600 typically includes receiving an electronic message from a computer application into an integration process, the message including one or more identified recipients of the message 602, and storing the message in a message repository 604. The example method 600 further includes receiving a message request from a remote groupware client, the message request including a requesting client identifier and remote groupware client type 606 and querying and retrieving one or more messages from the message repository as a function of the requesting client identifier 608. The method 600 also includes formatting the retrieved messages into a format of the remote groupware client as a function of the remote groupware client type 610 and sending the formatted messages to the remote client 612. In some embodiments, the message repository is a database, such as a relational database or other database.

Some embodiments further include pushing a received message to the remote groupware client upon receipt of the message. In some embodiments, electronic message may be received from two or more computer applications into the integration process.

Figure 7:
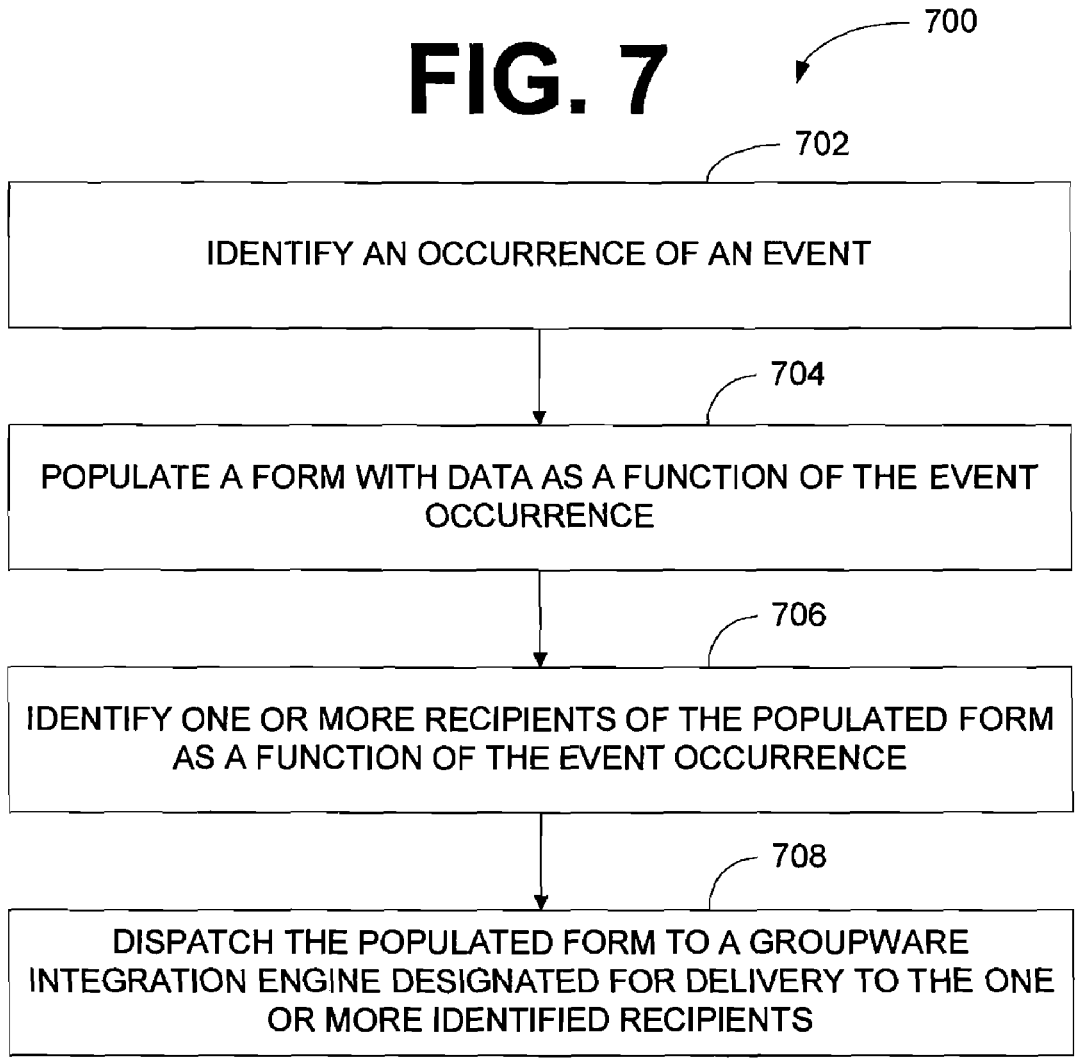
FIG. 7 is a flowchart of a method according to an example embodiment.

FIG. 7 is a flowchart of a method 700 according to an example embodiment. In some embodiments, the example method 700 includes receiving messages via an enterprise messaging system interface from one or more computer applications 702 and communicating via one or more groupware interfaces with one or more remote groupware clients 704. The method 700 may further include storing messages in a message repository received via the enterprise messaging system interface and the one or more groupware interfaces 706 and servicing message requests received from the one or more remote groupware clients over a groupware interface and pushing messages to the one or more computer applications over the enterprise messaging system interface 708.

In some embodiments, messages received and sent over the enterprise messaging system interface are communicated in a groupware-neutral format.

Sending a message to a first remote groupware client via a first groupware client interface typically includes retrieving the message from the message repository in response to a message query from the first remote groupware client and sending the message to the first groupware client interface. The message is then converted to a format operable with the first remote groupware client and sent to the first remote groupware client over a network.

Figure 8:
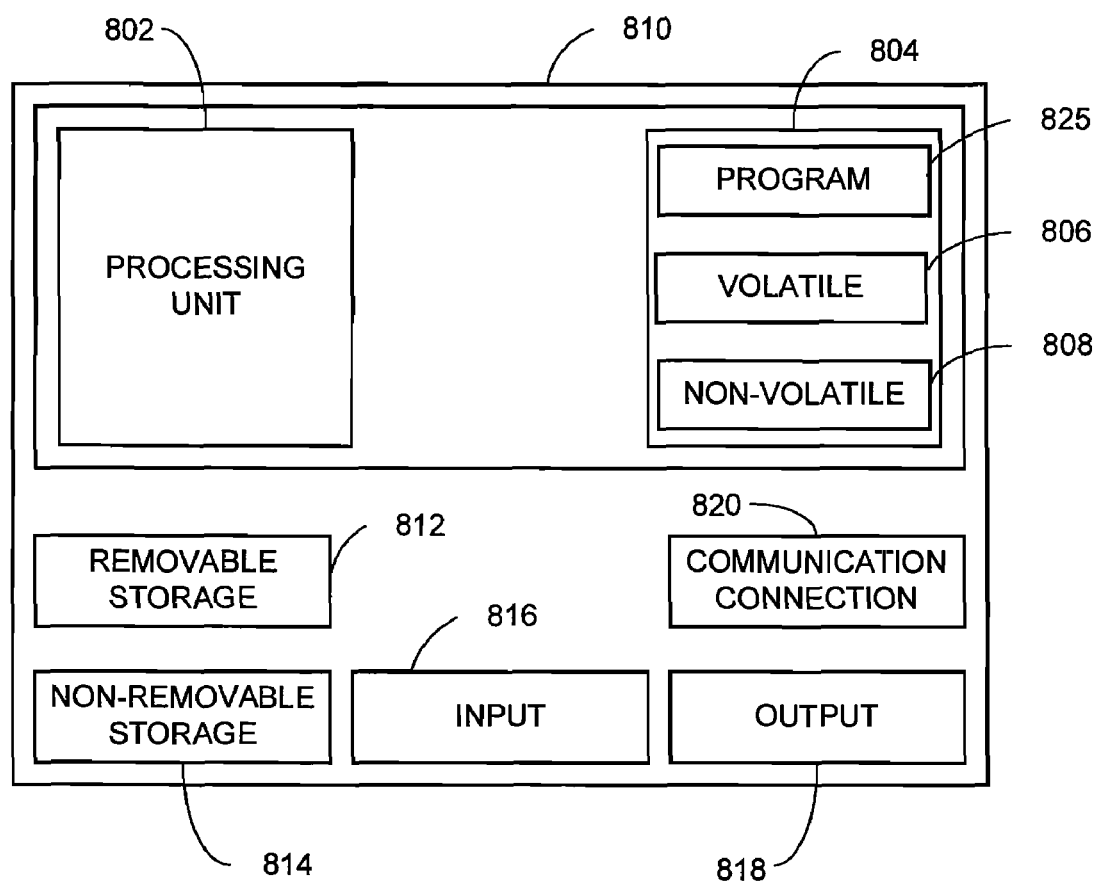
FIG. 8 is a schematic block diagram of a computing system according to an example embodiment.

FIG. 8 is a schematic block diagram of a computing system 800 according to an example embodiment. The system 800 is an example of a computing device upon which an application, such as the application 102, the groupware integration engine 106, the groupware client 112, or the groupware server 116, with reference to FIG. 1, may operate.

In one embodiment, multiple such computer systems are utilized in a distributed network to implement multiple components in a transaction-based environment. An object-oriented architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a computer-readable medium. For example, a computer program 825 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 810 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A computer implemented method comprising:
identifying, through execution of instructions on at least one computer processor, an event occurrence in a computer application;
caching identified event occurrences during at least one time frame; and
following passage of the at least one time frame:
populating a form with data as a function of the event occurrence;
identifying one or more recipients for the populated form as a function of the event occurrence; and
dispatching the populated form to a groupware integration engine designated for delivery by the groupware integration engine via a groupware interface to a groupware client application of each of the one or more identified recipients, wherein:
the groupware interface utilized for delivery of the populated form is one of at least one groupware interface, each groupware interface providing functionality to translate the populated form to a format of a particular groupware client application type;
the groupware interface retrieves the populated form over a network from a message repository in response to a retrieval request by the groupware client application of an identified recipient;
the groupware interface translates the retrieved, populated form to a format of the requesting client application based on a type of the requesting groupware client application; and
the groupware client application stores the populated and translated form retrieved from the groupware integration engine via the groupware interface with a groupware server application on a server.

2. The method of claim 1, wherein:
the identified event occurrence includes an update to contact information of a customer;
the form to be populated is a groupware contact update form; and
identifying the one or more recipients of the populated form as a function of the event occurrence includes selecting persons and roles associated with the customer.

3. The method of claim 2, wherein the populated groupware contact update form, when received by an identified recipient, causes the customer contact information to be updated within a groupware contact data store of the recipient.

4. The method of claim 1, wherein the form populated with data as a function of the event occurrence includes:
one or more data fields each mapped to one or more data items stored in a data repository;
an association to one or more recipients;
an association to an event, the occurrence of which causes the content item to be populated and dispatched to the one or more recipients.

5. The method of claim 4, wherein a recipient includes one or more of a person and role.

6. The method of claim 5, wherein a role is associated with one or more people.

7. A non-transient computer-readable storage medium, with instructions stored thereon operable to cause a computing device to:
identify an occurrence of an event in a computer application;
caching identified event occurrences during at least one time frame; and
following passage of the at least one time frame:
populate a form with data as a function of the event occurrence;
identify one or more recipients of the populated form as a function of the event occurrence; and
dispatch the populated form to a groupware integration engine designated for delivery by the groupware integration engine via a groupware interface to a groupware client application of each of the one or more identified recipients, wherein:
the groupware interface utilized for delivery of the populated form is one of at least one groupware interface, each groupware interface providing functionality to translate the populated form to a format of a particular groupware client application type;
the groupware interface retrieves the populated form from a message repository in response to a retrieval request by the groupware client application of an identified recipient;
the groupware interface translates the retrieved, populated form to a format of the requesting client application based on a type of the requesting groupware client application; and
the groupware client application stores the populated and translated form retrieved from the groupware integration engine via the groupware interface with a groupware server application on a server.

8. The non-transient computer-readable storage medium of claim 7, wherein:
the identified event occurrence includes an update to contact information of a customer;
the form to be populated is a groupware contact update form; and
identifying the one or more recipients of the populated form as a function of the event occurrence includes selecting persons and roles associated with the customer.

9. The non-transient computer-readable storage medium of claim 8, wherein the populated groupware contact update form, when received by an identified recipient, causes the customer contact information to be updated within a groupware contact data store of the recipient.

10. The non-transient computer-readable storage medium of claim 7, wherein the form populated with data as a function of the event occurrence includes:
one or more data fields each mapped to one or more data items stored in a data repository;
an association to one or more recipients;
an association to an event, the occurrence of which causes the content item to be populated and dispatched to the one or more recipients.

11. The non-transient computer-readable storage medium of claim 10, wherein a recipient includes one or more of a person and role.

12. The non-transient computer-readable storage medium of claim 11, wherein a role is associated with one or more people.

13. A system comprising:
an event monitoring module to identify an event occurrence in a computer application and cache identified event occurrences during at least one time frame, following the passage of which a form population module, a recipient identification module, a dispatching module, and at least one groupware interface process the cached identified event occurrences;

a form repository;

an application data store;

the form population module to retrieve a form from the form repository and populate the retrieved form with data retrieved from the application data store as a function of the event occurrence;

the recipient identification module to identify one or more recipients of the populated form as a function of the event occurrence;

the dispatching module to dispatch the populated form to a groupware integration engine designated for delivery by the groupware integration engine via a groupware interface to groupware client applications of each of the one or more identified recipients; and the at least one groupware interface to retrieve the populated form in response to a retrieval request by the groupware client applications of each of the one or more identified recipients, each of the at least one groupware interface utilized for delivery of the populated form providing functionality to translate the populated form to a format of a particular groupware client application type.

14. The system of claim 13, wherein:

the event monitoring module is operable to identify an update to contact information of a customer stored in the application data store;

the form population module is operable to populate a groupware contact update form; and the recipient identification module is operable to identify the one or more recipients by selecting persons and roles associated with the customer.

15. The system of claim 14, wherein a populated groupware contact update form, when received by an identified recipient, causes customer contact information to be updated within a groupware contact data store of a recipient.

16. The system of claim 13, wherein the form populated by the form population module with data as a function of the event occurrence includes:

one or more data fields each mapped to one or more data items stored in the application data store;

an association to one or more recipients;

an association to an event, the occurrence of which causes the form population module to populate the content item and the dispatching module to dispatch the populated content item to the one or more recipients.

17. The system of claim 16, wherein a recipient includes one or more of a person and role.

* * * * *